United States Patent Office 3,499,057
Patented Mar. 3, 1970

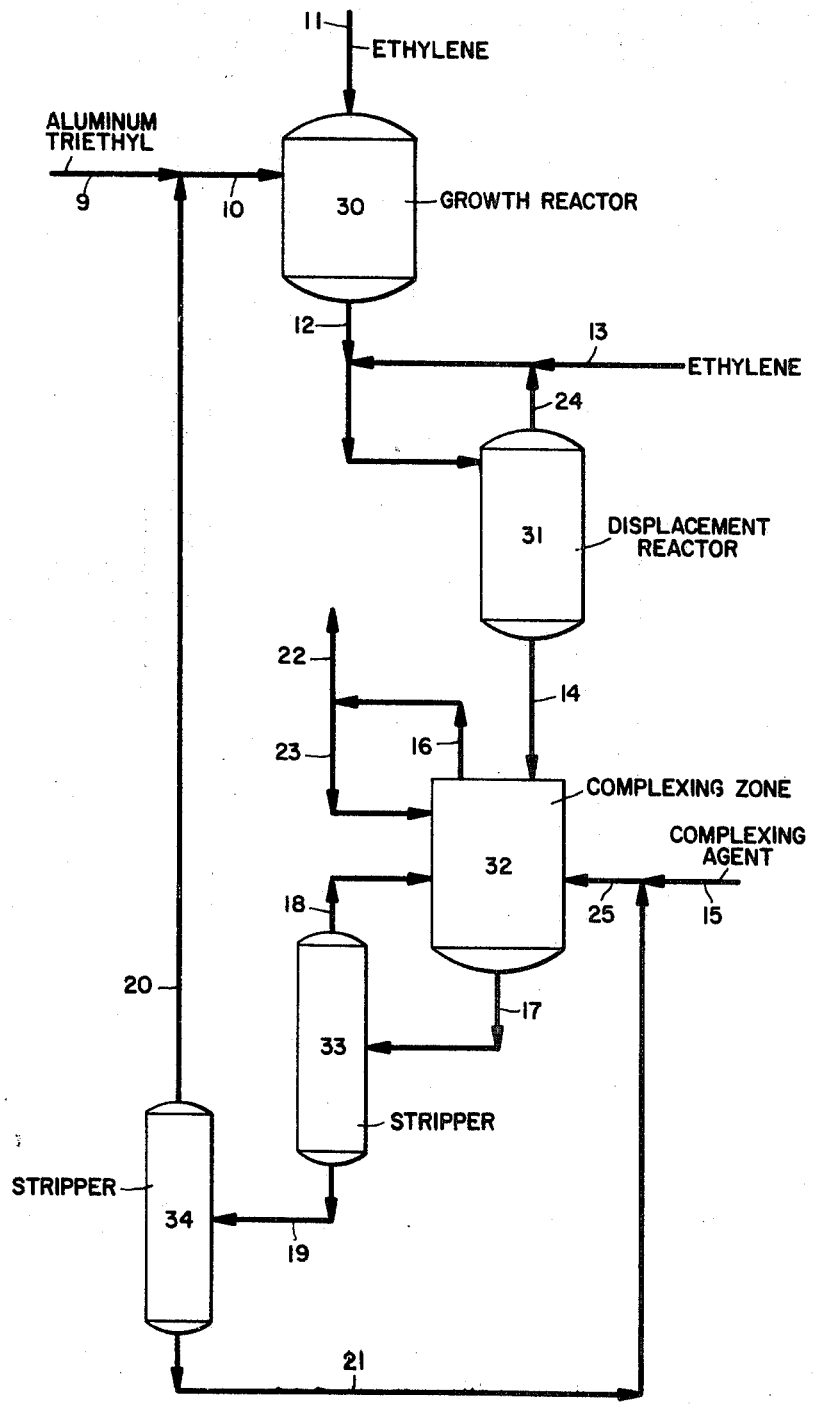

3,499,057
PREPARATION OF OLEFINS BY ALKYL
METAL TECHNIQUE
Joseph Serratore, Sarnia, Ontario, Canada, assignor to Esso Research and Engineering Company, a corporation of Delaware
Filed Dec. 14, 1965, Ser. No. 513,736
Int. Cl. C07c 3/10, 7/00; C08f 1/30
U.S. Cl. 260—683.15
2 Claims

ABSTRACT OF THE DISCLOSURE

Linear Lewis base polymers are employed to separate alpha olefins formed by ethylene growth reactions from aluminum trialkyls by complexing with the trialkyls to form a separate liquid phase which may be easily recovered.

---

This invention relates to the preparation of normal alpha olefins. More particularly, this invention relates to an improved method for preparing normal alpha olefins by the process known to the art wherein: (1) ethylene is added or grown onto lower molecular weight aluminum trialkyls to produce higher molecular weight aluminum trialkyls; (2) the higher molecular weight aluminum trialkyls are reacted with lower olefins to obtain a displacement of the higher molecular weight alkyl groups by said lower olefins thus forming alpha olefins corresponding to the alkyl groups and lower molecular weight aluminum trialkyls; and (3) separating the lower molecular weight aluminum trialkyls from the higher olefins. Still more particularly, this invention relates to the preparation of normal alpha olefins by employing a novel method for separating the lower molecular weight aluminum trialkyls from the higher alpha olefins, subsequently recovering upwards of 98% of the lower molecular weight aluminum trialkyls and substantially pure olefins.

The prior art has recognized the basic process as outlined by the above steps. The first two steps may be illustrated by the following expressions:

(1) growth reaction—

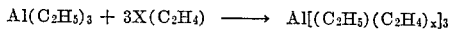
$$Al(C_2H_5)_3 + 3X(C_2H_4) \longrightarrow Al[(C_2H_5)(C_2H_4)_x]_3$$

(2) displacement reaction—

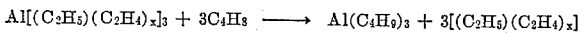
$$Al[(C_2H_5)(C_2H_4)_x]_3 + 3C_4H_8 \longrightarrow Al(C_4H_9)_3 + 3[(C_2H_5)(C_2H_4)_x]$$

It is the third step, however, separation of the higher olefins from the lower molecular weight aluminum trialkyls, that has caused the most difficulty. The problems involved in the separation have stimulated extensive research to develop new methods to effect this separation that are both efficacious and economical. These problems are due to the fact that no practical methods were known for completely separating olefins boiling close to the $C_{12}$–$C_{14}$ range from the $C_2$–$C_3$ aluminum trialkyls remaining after displacement. (For ease of description, the number of carbon atoms described in connection with aluminum trialkyls, e.g. $C_2$, refers to the number of carbon atoms in each alkyl group.) Thus, $C_{12}$ and higher olefins could not be economically distilled overhead from the liquid low molecular weight aluminum trialkyls due to the similarity in boiling ranges; and, the added factor that aluminum trialkyls have relatively low decomposition temperatures and cannot be exposed to high distillation temperatures for any length of time. Therefore, some prior art processes were limited to the production of olefins up to $C_{10}$. However, $C_{12}$ and higher olefins would, nevertheless, form in minor amounts and had to be removed. Usually, a purge stream was used for removal, which involved the loss of valuable commingled amounts of aluminum trialkyls. In order to keep such losses to a minimum, $C_{12+}$ olefins were recycled until fairly high concentrations were obtained. This recycle deleteriously affected the process due to the high cost of recycling large amounts of material.

In order to produce the full range of olefins that might be prepared from this process, it was proposed to employ two displacement reactions, the first displacement involving a $C_4$–$C_8$ olefin, the second involving ethylene. The method was found to be highly practical in recovering $C_{12+}$ olefins. However, fractionation was required and several inherent disadvantages were found to exist in the double displacement method. For example, fractionation involved relatively long exposure times at high reaction temperatures and the use of costly equipment. The thermal sensitivity of the aluminum trialkyls and of olefins to isomerization and addition reactions yielding branched olefins, led to difficulties in obtaining hgh yields of substantially pure products.

Additionally, in order to produce olefins in an economically feasible manner, it is essential to have a ready supply of the lower molecular weight aluminum trialkyls, e.g. triethyl aluminum, at the lowest possible cost. Therefore, it is necessary that the triethyl aluminum growth reactant be recycled in substantially pure form.

A variation of the double displacement method was also proposed. This variation employed $C_{18}$–$C_{22}$ olefins in the first displacement and $C_2$–$C_3$ olefins in the second displacement. The process allowed distillation of the lower olefins subsequent to the first displacement and distillation of the lower molecular weight aluminum trialkyls subsequent to the second displacement. Although also practical and minimizing the inherent disadvantages of the basic double displacement process, costly equipment was still required and an expensive reactant, $C_{18}$–$C_{22}$ olefin, was necessary.

In order to eliminate the necessity for costly distillation and fractionation equipment, it was proposed to add a complexing agent which would extract the aluminum trialkyls from the product mixture of the displacement reaction. However, separation remained dependent upon distillation since the complexes formed were soluble in the hydrocarbon fraction.

It is one object of this invention, therefore, to provide a process whereby normal alpha olefins can be produced at relatively low costs and without the expensive equipment previously used. It is another object of this invention to provide a process whereby distillation of aluminum trialkyls in the presence of olefins will be wholly eliminated. It is still another object of this invention to provide a process whereby the full range of normal alpha olefins, $C_4$–$C_{28+}$, may be produced which have little or no branching. It is still another object of this invention to provide a process whereby the lower molecular weight aluminum trialkyls may be recovered for recycle in substantially pure form. These and still other objects will become apparent from the following description of the process and with specific reference to the attached drawing, schematically illustrating the process.

In accordance with the present invention, a process for the preparation of $C_4$–$C_{28+}$ olefins is provided which comprises the following steps: (1) reacting an aluminum trialkyl having 2–3 carbon atoms per alkyl group with ethylene under conditions of elevated temperature and ethylene pressures to produce a growth aluminum trialkyl having from about 4 to about 28 or more carbon atoms per alkyl group; (2) reacting said growth product with a lower olefin in a displacement reaction to obtain a range of olefins corresponding to the trialkyl growth product and lower molecular weight aluminum trialkyls; (3) addition of a complexing agent to the product mixture of the displacement reaction, thereby causing two liquid phases to form; one containing the full range of olefins, the other containing an adduct of the lower molecular weight aluminum trialkyls with the complexing agent; (4) separating the phases and recovering substantially pure normal alpha olefins; and (5) decomposing the adduct and recovering for recycle substantially pure complexing agent and lower molecular weight aluminum trialkyls. Thus, a process is provided whereby the full range of normal alpha olefins may be produced without the necessity and cost of fractionation or distillation. Further, the olefins and aluminum trialkyls are recovered in a particularly high degree of purity, thereby eliminating the need for further purification.

To fully understand the present invention, the operation of the process will be explained with reference to the attached drawing. FIGURE 1 is a schematic representation of a continuous process. The particular reactants cited in the following description are merely illustrative and are not to be considered as limiting the instant invention in any way.

Turning now to FIGURE 1, growth reactor 30 may be any simple reactor capable of withstanding the operating conditions of the growth reaction. Preferably, however, this reactor will comprise a tubular serpentine-like coil of from 50 to 300 feet in overall length. Since the growth reaction is exothermic and it is necessary to remove heat, heat exchange means are required for temperature control. Many techniques are available; however, it is preferred to use a tube within a tube. The internal tube, of inner diameters of ½″–10″, preferably under 6″, is the reactor wherein triethyl aluminum is reacted with ethylene. The outer tube completely encases the inner tube but is otherwise not connected thereto, and contains the coolant. The inner diameter of the outer tube, of course, must be greater than that of the inner tube, i.e. 2″–4″ greater. The coolant should preferably be a medium weight oil. Water is not recommended as a coolant since it hydrolyzes aluminum trialkyls readily and sometimes with explosive results. Ethylene is introduced into reactor 30 via line 11, recycle triethyl aluminum in line 20 being combined with any makeup that is required from line 9 and introduced to reactor 30 via line 10. The growth reaction occurs at temperatures ranging from about 200° F. to about 500° F., under ethylene pressures ranging from about 350 p.s.i.g. to about 7500 p.s.i.g., and a reaction time of about .01 second up to an hour or more. The growth reaction may be summarized by the following expression:

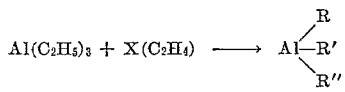

wherein, R, R′ and R″ attached to the aluminum atom represent normal alkyl radicals of the same or different molecular weight. During the reaction ethylene radicals are disposed in between the aluminum-carbon bond of the triethyl aluminum, enlarging the size of the alkyl radical by multiples of two carbon atoms until the desired alkyl groups are obtained. If triethyl aluminum is the starting material, even-numbered alkyl groups will be the result; however, if tripropyl aluminum is the starting material, the growth product with ethylene will be odd-numbered alkyl groups. With regard to the growth product R, R′, R″, referred to above, may be the same, e.g. tributyl aluminum, tripentyl aluminum, trihexyl aluminum, trioctyl aluminum, tridodecyl aluminum, tritetradecyl aluminum, trihexadecyl aluminum, trieicosyl aluminum, etc., or, as in most instances, the alkyl groups may be different, e.g. ethyl hexyloctyl aluminum, dibutyloctyl aluminum, octyl dodecyl hexadecyl aluminum, etc., as well as mixed odd-numbered trialkyl aluminum compounds when tripropyl aluminum is used as the starting material. Occasionally, alkyl aluminum hydrides occur during growth. Insofar as the growth product is concerned, the lowest boiling trialkyl aluminum is triethyl aluminum which boils close to normal $C_{12}$ alpha olefins. Tripropyl aluminum boils close to the normal $C_{14}$ alpha olefins, and tributyl aluminum boils within the range of the normal $C_{16}$–$C_{18}$ alpha olefins.

Returning now to the drawing, the product of the trialkyl aluminum growth reaction, which contains the trialkyl aluminum growth product, unreacted ethylene and triethyl aluminum, is passed by line 12 to displacement reactor 31. The displacing agent, for this illustration ethylene in line 13, is commingled with the growth product before entering displacement reactor 31. The displacement reaction is illustrated by the following expression:

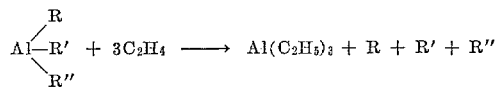

wherein R, R′ and R″ are as previously described. Displacement reactor 31 will operate at temperatures ranging from about 400° F. to about 700° F., under pressures of from about 3 p.s.i.g. to about 300 p.s.i.g., and residence time will be generally short, e.g. 0.005–10 seconds. Longer times, up to 5 hours, at temperatures of about 60–400° F. may be tolerated; however, undesirable side reactions will develop at such temperatures. The displacement reaction thus generates olefins corresponding to the alkyl groups in the trialkyl aluminum growth product. Any excess ethylene is usually flashed off and returned via line 24 as ethylene feed. The displacement reaction products, triethyl aluminum and $C_4$–$C_{28+}$ olefins leave reactor 31 by line 14 and pass to complexing zone 32.

The complexing zone may be a stirred reactor, packed tower, or any reactor suitable for carrying out the complexing reaction. The complexing agent, for purposes of this illustration a polyether, such as polyethylene oxide, is introduced into complexing zone 32 via line 25. Line 25 is the combination of recycle complexing agent from line 21 and makeup from line 15. The polyether is normally in the liquid phase, i.e. above its melting point, in the recycle line. Depending on the particular complexing agent used, the temperature in the complexing zone may vary widely. However, the temperature must be below the decomposition point of the adduct to be formed. Normally, adduct formation will occur at temperatures in the range of about 50–300° F., while a range of about 140–200° F. is preferred. Since the materials entering zone 32 will be at temperatures higher than the operating temperatures for the complexing reaction, a cooling jacket for zone 32 will be necessary. Alternatively, lines 14 and 25 may be cooled prior to their introduction to zone 32 by heat exchangers (not shown) on their respective lines. The pressure in complexing zone 32 is not critical and may range from atmospheric to about 100 p.s.i.g. Generally, the complexing reaction will be complete in about 0.5 hour. However, depending upon materials, temperatures, etc., complexing may take from 1 minute to 2 hours or more. Adduct formation will be complete when the two liquid phases are relatively clear, as opposed to the cloudy mixture that forms when the complexing agent is added. If a single stage reactor is used, a settling tank (not shown) will usually be required, with settling periods ranging up to 72 hours. However, if the complexing zone in the form of a liquid-liquid extractor or a centrifuge, the entrainment of olefins in the polyether-trialkyl aluminum adduct will be substantially reduced, minimizing the need for a settling tank. Under normal conditions the complexing reaction will be complete in 0.5–16 hours. The complexing agent will coordinate with the triethyl aluminum, thereby extracting the triethyl aluminum from the displacement mixture into a separate liquid phase, insoluble in the olefins produced by displacement. Completion of this reaction yields two mutually insoluble liquid phases; the upper phase will contain the normal alpha olefins having little or no branchiness, the lower phase will contain the polyether-trialkyl aluminum adduct. The products may then be easily separated by mechanical means, such as filtration or draining. The upper, or olefin layer, is drawn off through line 16 and if substantial quantities of trialkyl aluminum are entrained, the stream may be pumped back by way of line 23, or olefins may be recovered from line 22, if substantially pure. Separation of the olefins from the adduct will normally be completed in the complexing zone; however, if not so completed, the adduct is drawn from the bottom of the reactor through line 17 and passes to column 33, which may be a stripper or flash drum. In column 33, any entrained olefins up to eicosene will be removed as overhead and recycled to complexing zone 32, via line 18. Column 33 will normally operate at temperatures ranging from 300° F. to 400° F. and subatmospheric pressures of about 1-20 mm. Hg. The bottoms, containing the adduct and small amounts of $C_{20+}$ olefins will leave column 33 by way of line 19 and pass to a second column 34. Column 34 serves to separate the adduct into its respective fractions for recycle to the process. A wiped film evaporator, a second stripper or a distillation tower may be employed for this purpose. The temperature in column 34 will normally be higher than that in stripper 33, in order to decompose the adduct. A temperature range of from about 400-600° F. at pressures of about 1-20 mm. Hg will decompose any adduct formed in the normal process of this invention. Residence time will vary, depending upon the mass flow, type of adduct and temperature. However, residence may be as low as 0.1 second or as long as 1.0 hour or more. In order to achieve the best results, the adduct must be fully decomposed. Triethyl aluminum is recovered as overhead and recycled by way of line 20 to the growth reactor 30. Polyether will be the bottoms product and will be recycled to complexing zone 32, via line 21. Some $C_{20+}$ olefin, not flashed off in reactor 33, will accompany the triethyl aluminum recycle in line 20; however, this will be a small amount and will reach equilibrium at amounts to small to affect any of the reactions. The recycle of complexing agent by way of line 21 will include 1-2% triethyl aluminum that will similarly not affect any reaction. Since the active polymer life of the complexing agent may be shortened by long exposures to high temperatures in the decomposition stage, the wiped film evaporator is preferred for column 34.

Equally applicable, as an alternative to separating the adduct in a stripper or wiped film evaporator, is the use of a vacuum reactor in which the adduct is heated to about 400-500° F. under subatmospheric pressures of 1-20 mm. Hg for about 1 to 3 hours. As another alternative, the adduct may be contacted with a hot inert purge gas, e.g. nitrogen, at 400-500° F. The polyether and triethyl aluminum are again separately recovered and recycled for use in the process. In these latter recovery methods triethyl aluminum can be recovered substantially free of entrained higher olefins. Any entrained olefins are removed with the polyether and may be recovered, if economically justified, by conventional methods, e.g. condensation. Furthermore, in these latter methods conventional distillation equipment, rather than the more costly short-residence time equipment, can be utilized.

The process illustrated in the flowpan utilizes triethyl aluminum as the growth reactant and ethylene as the displacement reactant. However, this invention also contemplates the use of tripropyl aluminum in the growth reaction. Moreover, the use of olefins such as propylene, butylene, pentene, or hexene in the displacement reaction is also contemplated. However, as the number of carbon atoms of the olefin displacement reactant increases, the ability of the newly formed lower molecular weight aluminum trialkyl to form a hydrocarbon insoluble adduct phase after complexing decreases. Therefore, it is preferred to employ alkyl groups containing 2 to 6 carbon atoms as the displacement reactant and it is particularly preferred that the lower members of this group, e.g. ethylene, be used. Additionally, this invention contemplates the use of alternate metals in place of aluminum. Thus, other metals can be used, providing: (1) the volatility of the proposed metal alkyls is sufficiently low that vaporization losses during displacement can be kept to a minimum; and (2) the lower metal alkyls can readily dissociate to the intermediate alkyl metal hydrides in a manner similar to aluminum alkyls. Representative of such metal alkyls are gallium alkyls, e.g. gallium triethyl, and beryllium alkyls, e.g. beryllium triethyl.

The complexing agents employed in this invention may be broadly characterized as linear Lewis base polymers (cross-linked polymers having been found to be unsuitable as complexing agents). A Lewis base is defined as a molecule that acts as an electron donor. Additionally, the complexing agent should impart two essential properties to the aluminum trialkyl adduct: (1) the adduct must be sufficiently unstable so that the recovery of aluminum trialkyls can be achieved by simple means; and (2) the adduct and the free olefins must form two phases so that a physical separation can be made. Many previously suggested, nonpolymeric compounds, served only to differentiate the boiling points of the olefins from the aluminum trialkyls so that separation by distillation could be employed. Aside from the previously mentioned disadvantages inherent in the distillation of olefins in the presence of aluminum trialkyls, complexes formed by the nonpolymeric compounds and the aluminum trialkyls tended to decompose, thus inhibiting the separation and increasing its cost. Other, previously suggested, complexing agents forming two phases involved poisonous metal salts requiring extremely expensive purification procedures to remove residual traces from the olefin product.

Linear polymers that have incorporated into their structure Lewis bases and are preferred for use as complexing agents in this invention are (listed in descending order of adduct stability with aluminum trialkyls): tertiary amines, tertiary phosphines, ethers and thioethers. Other electron donor polymers may also be used for coordinating with aluminum trialkyls. (Polymers containing acidic hydrogen sites are not suitable for coordinating with aluminum trialkyls since such polymers tend to react with the aluminum trialkyls rather than form an adduct in a separate liquid phase.) The choice of polymer containing the proper Lewis base permits a wide selection of complex stability; thus, allowing a variety of separation techniques for the olefin-adduct product and the decomposition of the adduct.

Preferred for use as complexing agents are the linear polyethers such as polyphenyl oxide, polyethylene oxide, copolymers of polyethylene oxide with polypropylene oxide, polyvinyl methyl ether, polyacrylonitrile, polyvinyl carbazole, and polyvinyl pyrrolidone; polyethylene oxide and polyethylene oxide-polypropylene oxide copolymers being particularly preferred. When using the copolymer of ethylene oxide-propylene oxide, the propylene oxide content of the copolymer is important to the extent that increasing propylene oxide content increases the solubility of the adduct in the hydrocarbon phase, thus impairing the degree of separation that can be attained. Since there is no well-defined end point at which the solubility of the adduct in the olefin phase changes sharply, it becomes a matter of practical significance as to the maximum allowable propylene oxide content. For example, an 80 wt. percent propylene oxide polymer did not form two liquid phases when complexed with aluminum triethyl in admixture with dodecene. It has been found, however, that a propylene oxide content as high as 60 wt. percent has no deleterious effect on the formation of separate phases. Therefore, it is preferred that copolymers of ethylene oxide and propylene oxide contain no more than 60 wt. percent propylene oxide. Polythioethers will act in the same way, and the foregoing discussion is equally applicable to them.

Although the polymers described above are generally applicable to this invention, it is essential that the molecular weight of the polymer utilized as complexing agent be within specified limits. Thus, it has been found that increasing molecular weight of the aluminum alkyls tends to increase the amount of olefins entrained in the adduct. Furthermore, polymeric complexing agents having molecular weights above about 100,000 tend to form solid complexes (rather than liquid complexes) making separations more difficult. Complexing agents with molecular weights of about 1,000,000 form a gelatinous mass which entrains a substantial portion of the olefins. On the other hand, polyethers, containing terminal hydroxyl groups, of molecular weights below about 1000 cause rapid evolution of gaseous ethane, with no formation of a two phase product. Therefore, linear electron donor polymers having a molecular weight range of about 1000 to about 100,000 should be utilized, while a molecular weight range of about 3000 to 30,000 is preferred.

Further, another essential factor in effecting the best possible separation is the amount of complexing agent added to the displacement mixture. Practical considerations again play an important role in determining the proper amount of complexing agent addition since the resulting adduct does not form on a stoichiometric basis. Consequently, the best separations occur when a weight ratio of complexing agent to lower molecular weight aluminum trialkyls of about 0.7/1 to 1.5/1 is used, while a range of about 0.7/1 to 1.3/1 is preferred. Weight ratios below about 0.7/1 result in decreasing extraction of lower molecular weight aluminum trialkyls from the displacement mixture.

The following examples are for illustrative purposes only and are not to be considered as limiting this invention in any way.

EXAMPLES 1–7

Under a nitrogen atmosphere, a synthetic feed consisting of 321.0 grams of triethyl aluminum and 1144.2 grams of tetradecene-1 was prepared. A sample of this blended feed was weighed, diluted by pentane and hydrolyzed by methanol followed by 15% HCl solution. The aqueous layer was analyzed for soluble aluminum by the EDTA method. A value of 4.74 wt. percent soluble aluminum was determined for the synthetic feed. An Erlenmeyer flask mounted on a magnestir was used as the reaction chamber. The flask was stoppered and had a glass inlet tube and another glass tube led from the flask to an oil cylinder for collecting gas bubbles. The entire apparatus was kept in a dry box. The 20 wt. percent triethyl aluminum (calculated from 4.74 wt. percent Al) in tetradecene was weighed into the flask and predried, powdered polyether was added through the inlet tube with the aid of a drop funnel. The tube was sealed immediately after the addition of polymer in order to check the amount of gas evolved during the initial complexing period. Any gas evolved would be mainly ethane from the reaction of triethyl aluminum with free HOH or OH groups present in the polymer. For higher temperatures a silicon oil bath heater and stirred by a pyro-magnestir was used as the reaction chamber. At the end of the reaction period the products were allowed to settle for 4–5 hours. Samples of the upper liquid layer were taken, hydrolyzed by methanol followed by 15% HCl solution and analyzed by EDTA. Results are shown in Table I.

TABLE I

| Example No. | Complexing Agent | | Weight Ratio $Al(Et)_3$/ Polyether | Extraction Conditions | | Percent $Al(Et)_3$ Extracted |
|---|---|---|---|---|---|---|
| | Type [a] | Molecular Weight | | Temp., °C. | Time, Hrs. | |
| 1 | {PEO [b] / PPO} | 2,900 | 0.75 | Ambient | 16 | 90.7 |
| 2 | {PEO [c] / PPO} | 8,700 | 0.75 | Ambient | 20 | 94.5 |
| 3 | {PEO [c] / PPO} | 8,700 | 1.28 | Ambient | 16 | 92.2 |
| 4 | PEO | >100,000 | 1.25 | 120 | 0.5 | 86.5 |
| 5 | PEO | ~6,000 | 1.36 | 105 | 0.5 | 92.6 |
| 6 | PEO | ~1,000 | 1.36 | 93 | 0.5 | ([d]) |
| 7 | PEO | >1,000,000 | 1.07 | 120 | 0.5 | ([e]) |

[a] PEO is polyethylene oxide; PPO is polypropylene oxide.
[b] 40 wt. percent PEO, 60 wt. percent PPO.
[c] 80 wt. percent PEO, 20 wt. percent PPO.
[d] Rapid gas evolution did not form two phases.
[e] Gelatinous mass.

Example 6 shows that polymers having a molecular weight below about 1000 result in gas evolution and do not permit a separation of olefins from aluminum trialkyls by complexation. Example 7 shows that molecular weights above 1,000,000 also do not allow separation by complexation because of the formation of a gelatinous mass within which the olefins are entrained.

EXAMPLE 8

In apparatus similar to that used in Example 1, 10 cc. of aluminum triethyl was mixed with 35 grams of a $C_{12}$ alpha olefin. To this mixture was added 12.6 grams of a linear polyether copolymer of 80 wt. percent polypropylene oxide and 20 wt. percent polyethylene oxide and a molecular weight of 2200. The weight ratio of polyether to aluminum triethyl was 0.7/1. The mixture was warmed slightly and allowed to stand. The resulting product was a single phase clear liquid, indicating complete solubility of the components in the mixture. The mixture was then placed in a freezer for 15 minutes. There was no solids formation; the product remained a homogeneous liquid.

EXAMPLES 9–11

Polyethers were weighed and added to a motor driven stirred flask via the inlet tube. Accessories were the same as in Example 1. The polymer was dried at 150° C. for two hours under a nitrogen atmosphere. The triethyl aluminum and olefin solution was weighed into a sealed flask under nitrogen blanketing and then added to the reaction flask. The contents were heated to 80–90° C. with stirring for ½–1 hour. The products were allowed to settle out for a 16-hour period either in the reaction flask or in a separatory funnel. Table II shows the results.

TABLE II

| Ex. No. | Complexing Agent | | Weight Ratio $Al(Et)_3$/ Polyether | Extraction Conditions | | Settling Period, Hr. | Percent $Al(Et)_3$ Extracted |
|---|---|---|---|---|---|---|---|
| | Type [a] | Molecular Weight | | Temp., °C. | Time, Min. | | |
| 9 | PEO | 6,000 | 1.31 | 90 | 35 | 0.25 | 89.5 |
| 10 | PEO | 6,000 | 1.05 | 90 | 45 | 16 | 92.4 |
| 11 | PEO | >1,000,000 | 1.22 | 125 | 35 | Gelatinous mass | |

[a] PEO is polyethylene oxide.

Another run was conducted under similar conditions as in Examples 9–11; however, the weight ratio of triethyl aluminum to polyether was 4.14. The triethyl aluminum extracted was 27.0%, indicating that the weight ratio employed is not practical for the separation under consideration.

EXAMPLES 12–18

A $C_9$ average growth aluminum trialkyl was produced at 310° C., 50 p.s.i.g., 0.4 second residence time and mole ratio of ethylene to growth alkyl of 39.3. An overall conversion of 96.6 mole percent was obtained. The trialkyl growth product was displaced with ethylene and to produce triethyl aluminum and a range of olefins having the composition shown in Table III. The triethyl aluminum was extracted with several polyethers of differing molecular weights. Results are shown in Table III. The triethyl aluminum was extracted with several polyethers of differing molecular weights. Results are shown in Table IV. Equipment and procedure were similar to that in Example 1.

TABLE III

Components, wt. percent:

| | |
|---|---|
| Butane | 0.36 |
| Hexane | 0.62 |
| Hexene-1 | 3.27 |
| Hexene (Type II) | ---- |
| Unknown | 0.11 |
| Octane | 0.16 |
| Octene-1 | 13.24 |
| Octene (Type II) | 0.17 |
| Unknown | 0.18 |
| Decane | 0.43 |
| Decene-1 | 17.24 |
| Decene (Type II) | 0.44 |
| Unknown | 0.23 |
| Dodecane | 0.45 |
| Unknown | 0.18 |
| Dodecene-1 | 17.52 |
| Dodecene (Type II) | 0.15 |
| Unknown | 0.19 |
| Tetradecane | 0.52 |
| Unknown | 0.16 |
| Tetradecene-1 | 15.51 |
| Tetradecene (Type II) | 0.56 |
| Unknown | 0.10 |
| Hexadecane | 0.76 |
| Hexadecene-1 | 11.22 |
| Hexadecene (Type II) | 0.52 |
| Unknown | 0.04 |
| Octadecane | 0.72 |
| Octadecene-1 | 6.58 |
| Octadecene (Type II) | 0.32 |
| Unknown | 0.02 |
| Eicosane | 0.66 |
| Eicosene-1 | 3.61 |
| Eicosene (Type II) | 0.17 |
| Unknown | ---- |
| Docosane | 0.46 |
| Docosene-1 | 1.53 |
| Docosene (Type II) | 0.04 |
| Tetracosane | 0.40 |
| Tetracosene-1 | 0.89 |
| Unknown | ---- |
| Hexacosane | 0.08 |
| Hexacosene-1 | 0.19 |

TABLE IV

| Ex. No. | Complexing Agent Type a | Complexing Agent Molecular Weight | Weight Ratio of Al(C₂H₅)₃ /Polyether | Reaction Conditions Temp., °C. | Reaction Conditions Time, Min. | Settling Period, Hrs. | Percent Al(C₂H₅)₃ Extracted |
|---|---|---|---|---|---|---|---|
| 12 | PPO | 16,000 | 0.85 | 90 | 30 | 48 | 96.4 |
| 13 | PPO | 5,000 | 0.78 | 80 | 35 | 14 | 97.5 |
| 14 | PPO | 14,000 | 0.73 | 80 | 30 | 24 | 97.7 |
| 15 | PEO | 16,000 | 0.77 | 80 | 30 | 24 | 96.7 |
| 16 | PEO | 11,000 | 0.71 | 80 | 35 | 48 | 97.5 |
| 17 | PEO | 14,000 | 0.81 | 95 | 30 | 72 | 96.6 |
| 18 | PEO | 6,000 | 1.13 | 80 | 30 | 48 | 95.0 | a PEO is polyethylene oxide; PPO is polypropylene oxide.

What is claimed is:

1. A continuous cyclic process for the preparation of an olefin product having a predominance of straight chain $C_4$–$C_{28}$ olefins which comprises:

reacting ethylene with an aluminum trialkyl containing 2–3 carbon atoms per alkyl group in a growth reaction zone at temperatures of 200–500° F. and pressures of 350–7500 p.s.i.g. to obtain a growth product comprising aluminum trialkyls having 4–28 carbon atoms per alkyl group;

recovering said growth product from said reaction zone;

reacting said growth product with ethylene at temperatures of 400–700° F. and pressures of 3–300 p.s.i.g. to obtain a displacement mixture comprising $C_4$–$C_{28}$ olefins and aluminum trialkyl;

forming a two-phase liquid product by contacting the displacement mixture, in a complexing zone at temperatures of 140–200° F. and pressures of 0–100 p.s.i.g., with a linear polymeric complexing agent selected from the group consisting of tertiary amines, tertiary phosphines, ethers, and thioethers, having a molecular weight of 3000–30,000, for a period of time of 0.5–16 hours, and sufficient to provide a weight ratio of the complexing agent to aluminum triethyl of 0.7/1 to 1.3/1;

separating the two liquid phases to recover independently substantially pure $C_4$–$C_{28}$ olefins and an adduct of the complexing agent and aluminum trialkyl;

decomposing the adduct at temperatures of 400–600° F. and pressures of 1–20 mm. mercury;

independently recovering substantially pure aluminum triethyl and substantially pure complexing agent;

and recycling the aluminum trialkyl to the growth reaction zone, and recycling the complexing agent to the complexing zone.

2. The process of claim 1 wherein said trialkyl is triethyl.

References Cited

UNITED STATES PATENTS 3,149,179  9/1964  Bowden.
3,326,953  6/1967  Gautreaux.
3,352,894  11/1967  Crain et al. _____ 260—665 X PAUL M. COUGHLAN, Jr., Primary Examiner U.S. Cl. X.R.

260—448, 677